(No Model.)

M. HENDERSON
TACK CLAW.

No. 598,306. Patented Feb. 1, 1898.

Witnesses
F. B. Berry,
Victor J. Evans

Inventor
Michael Henderson,
By John Wedderburn
Attorney

United States Patent Office.

MICHAEL HENDERSON, OF DETROIT, MICHIGAN.

TACK-CLAW.

SPECIFICATION forming part of Letters Patent No. 598,306, dated February 1, 1898.

Application filed August 17, 1897. Serial No. 648,536. (No model.)

*To all whom it may concern:*

Be it known that I, MICHAEL HENDERSON, a citizen of the United States, residing at Detroit, in the county of Wayne and State of Michigan, have invented certain new and useful Improvements in Tack-Claws; and I do hereby declare the following to be a full, clear, and exact description of the invention, such as will enable others skilled in the art to which it appertains to make and use the same.

This invention relates to improvements in tools, and has more particular relation to tack-claws.

The invention consists of a suitable receptacle, a tack-claw formed thereon, and a gate for normally closing the mouth of said receptacle for permitting the ingress of tacks from the claw.

The invention also consists of certain other novel constructions, combinations, and arrangements of parts, all of which will be hereinafter more particularly set forth and claimed.

Figure 1:
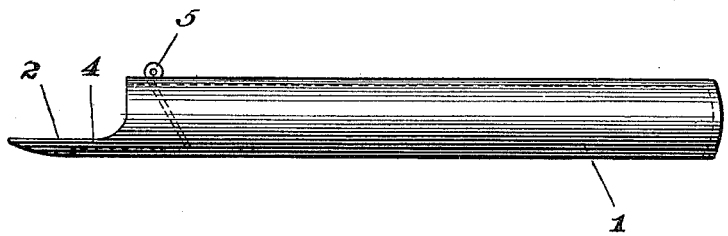
Figure 2:
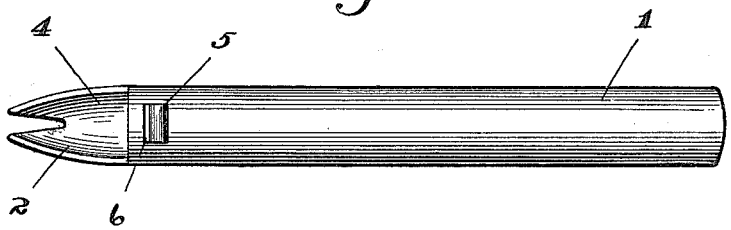
Figure 3:
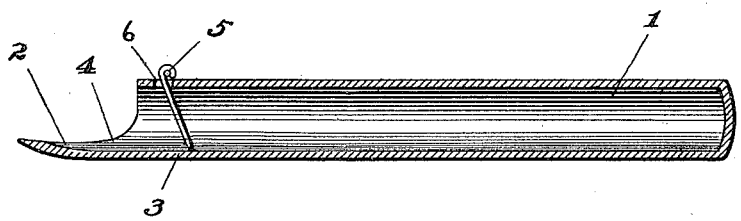

In the accompanying drawings, forming part of this specification, Figure 1 represents a side elevation of the device embodying my invention. Fig. 2 represents a top plan view of the same; and Fig. 3 represents a central vertical section through my said improvement.

1 in the drawings represents the tube, 2 the drawing-claw, and 3 the gate, hung loosely from the top of the tube. Said tube 1 is preferably constructed of metal and is closed at its rear end. The forward portion of said tube is cut away, as at 4, and formed into the tack-drawing claw 2. The forward open end of said tube is normally closed by the gate 3, which is formed to loosely fit the interior of said tube and is hung in the mouth of the same. Said gate 3 is provided with an extension or handle 5, which projects through a slot 6, formed in said tube, whereby the gate may be opened, when so desired, to permit of the tacks being withdrawn from the tube. It will be observed by reference to the drawings that the weight of the tacks in the tube 1 will normally rest upon said gate 3, and as the latter is mounted in an inclined position this weight will tend to hold said gate firmly closed. After the tack has been drawn by the claw the tube is held in the proper position for permitting the gate to open and the tack to pass within the tube. By this means the tacks are both drawn and caught at the same time. Should the gate at any time become clogged or slow in action, it may be instantly opened or closed by means of a slight pressure upon the handle 5. The said gate 3 is hung in the tube 1 in an inclined position, the weight of the tacks holding it closed.

My improved tool is very simple and cheap in construction, but at the same time very effective, as the tacks after once passing within the tube 1 cannot accidentally be spilled from the same in the operation of the tool, as the gate 3 automatically closes upon said tool being brought into operative position.

Having thus described my invention, what I claim as new, and desire to secure by Letters Patent, is—

1. A tack-claw comprising a suitable receptacle, a claw proper mounted at the mouth of same, and a hanging gate adapted to close the inlet in the said receptacle, substantially as described.

2. In a tack-claw, the combination with a suitable receptacle, of a tack-drawing claw arranged at the open end of the same, a hanging gate mounted in the open end of said receptacle, and a handle connected to said gate for operating the same, substantially as described.

3. In a tack-claw, the combination with a tube closed at one end only and having a tack-drawing claw at its outer end, of a gate mounted in the open end of said tube so as to normally remain closed when the tool is in operative position but automatically open upon the tool being inverted, substantially as described.

4. In a tack-claw, the combination with a tube closed at one end and provided at its opposite end with an elongated slot and a tack-drawing claw, of a gate mounted in the open mouth of said tube and provided with a handle adapted to project through the elongated slots, substantially as described.

In testimony whereof I have signed this specification in the presence of two subscribing witnesses.

MICHAEL HENDERSON.

Witnesses:
  ISABELLA H. MACKEY,
  ELIZABETH Y. LOWRY.